(12) United States Patent (10) Patent No.: US 8,032,722 B2
Yoshida (45) Date of Patent: Oct. 4, 2011

(54) INFORMATION PROCESSING APPARATUS AND MEMORY CONTROL METHOD

(75) Inventor: Kazuhiko Yoshida, Kawagoe (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/845,381

(22) Filed: Jul. 28, 2010

(65) Prior Publication Data

US 2011/0107037 A1 May 5, 2011

(30) Foreign Application Priority Data

Oct. 29, 2009 (JP) ................................. 2009-248834

(51) Int. Cl.
*G06F 13/10* (2006.01)
(52) U.S. Cl. ...................................................... 711/154
(58) Field of Classification Search .................. None
See application file for complete search history.

(56) References Cited

U.S. PATENT DOCUMENTS

| | | | |
|---|---|---|---|
| 7,461,182 B2 | 12/2008 | Fukushima et al. | |
| 7,590,473 B2 | 9/2009 | Wyatt | |
| 2004/0264266 A1 | 12/2004 | Fukushima et al. | |
| 2004/0267984 A1 | 12/2004 | Fukushima et al. | |
| 2007/0191993 A1 | 8/2007 | Wyatt | |
| 2008/0098153 A1 | 4/2008 | Nishioka et al. | |

FOREIGN PATENT DOCUMENTS

| | | |
|---|---|---|
| JP | 2005-018329 | 1/2005 |
| JP | 2007-265393 | 10/2007 |
| JP | 2008-102759 | 5/2008 |

*Primary Examiner* — Duc Doan
(74) *Attorney, Agent, or Firm* — Blakely, Sokoloff, Taylor & Zafman LLP

(57) ABSTRACT

According to one embodiment, an information processing apparatus includes memory modules, a measuring module, a determination module, and a controller. The measuring module initializes the memory modules when the apparatus has been booted and an operating system of the information processing apparatus has not yet been started, measures a temperature of the memory modules at a time of the initialization, and measures a maximum temperature of each of the memory modules when the operating system is running. The determination module determines a first memory module, which has the least difference between the temperature at the time of the initialization and the maximum temperature at the time when the operating system is running, and a second memory module which has the lowest temperature at the time of the initialization. The controller maps memory addresses allocated to the first memory module in the second memory module, based on the temperatures.

10 Claims, 6 Drawing Sheets

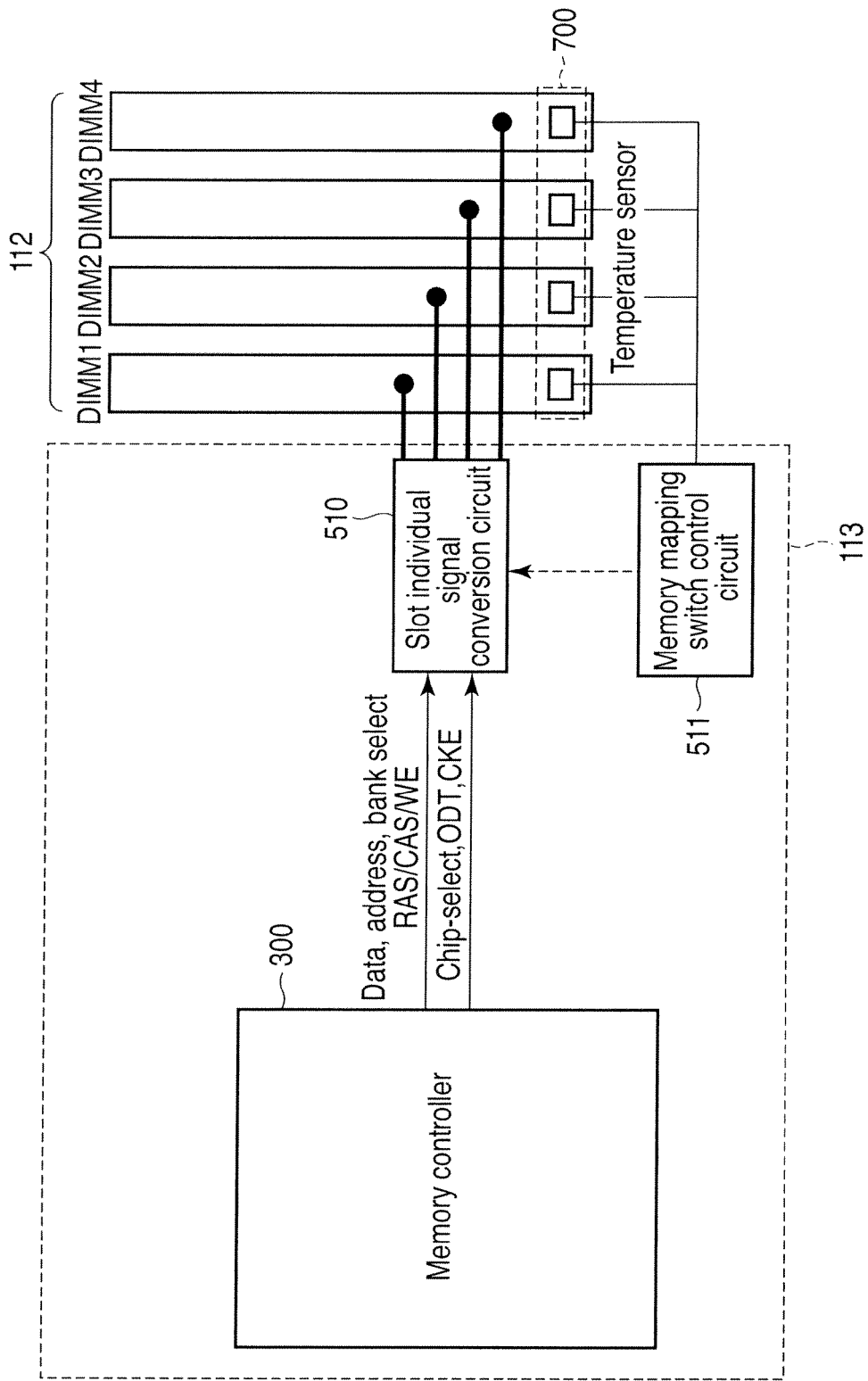
F I G. 3

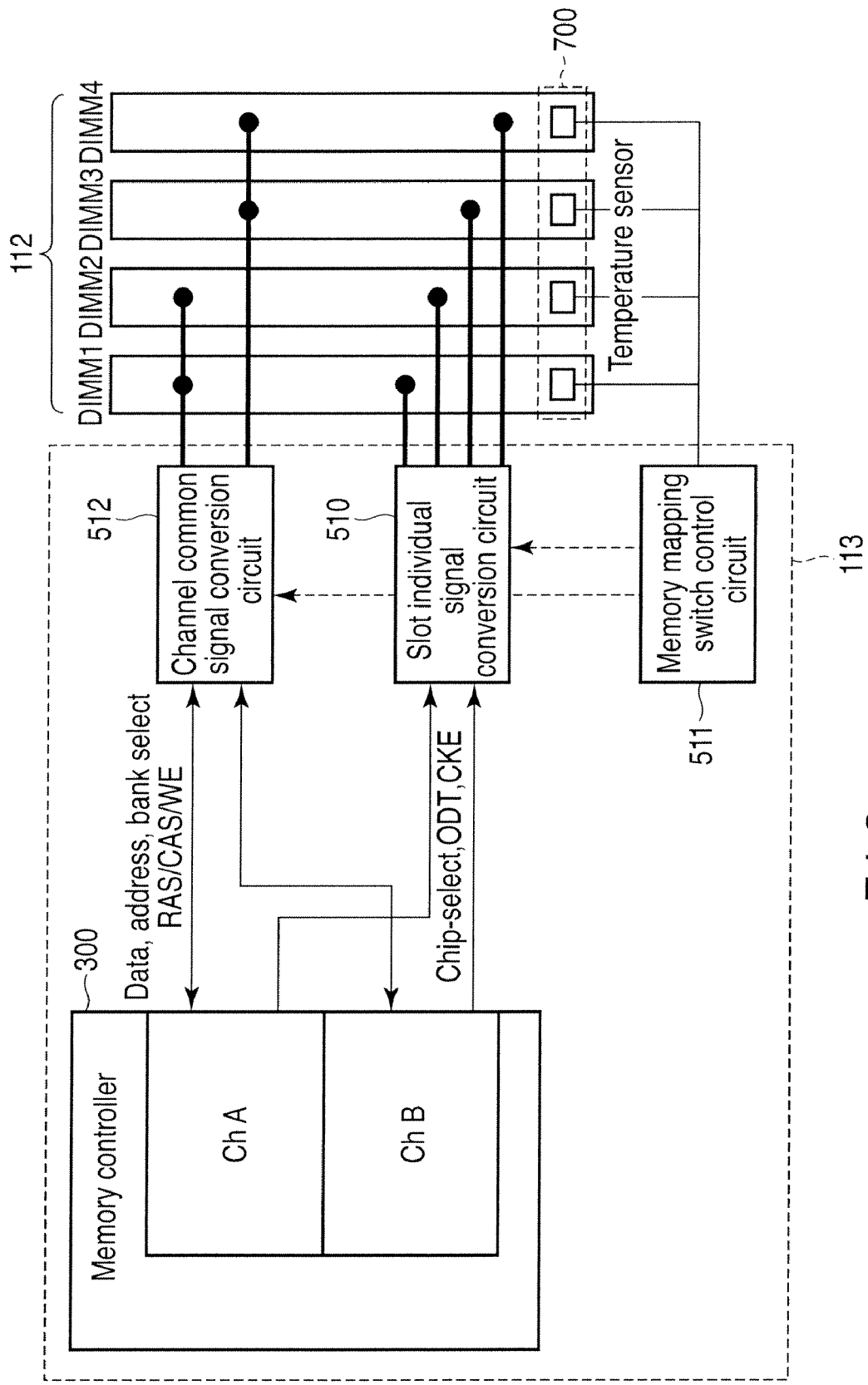
F I G. 7

| Item | DIMM1(ch A) | DIMM2(ch A) | DIMM3(ch B) | DIMM4(ch B) |
|---|---|---|---|---|
| When memory is initialized by BIOS | 70°C | 85°C | 80°C | 75°C |
| When OS is running | 70°C | 75°C | 75°C | 60°C |
| Temperature difference between time when memory is initialized by BIOS and time when OS is running | 0°C | -10°C | -5°C | -15°C |

INFORMATION PROCESSING APPARATUS AND MEMORY CONTROL METHOD

CROSS-REFERENCE TO RELATED APPLICATIONS

This application is based upon and claims the benefit of priority from Japanese Patent Application No. 2009-248834, filed Oct. 29, 2009; the entire contents of which are incorporated herein by reference.

FIELD

Embodiments described herein relate generally to an information processing apparatus which controls memory modules, and a memory control method applied to the information processing apparatus.

BACKGROUND

In general, an information processing apparatus, such as a personal computer, includes a memory module for temporarily reading and executing an operating system (OS) and various applications. Since a load is applied to the memory module in accordance with the transfer rate of data that is to be read, the temperature of the memory module rises. If the temperature of the memory module rises to a high degree, the operation of the computer may be affected. To address this problem, Jpn. Pat. Appln. KOKAI Publication No. 2005-18329, for example, discloses a technique of executing control to prevent the temperature of a memory module from reaching a preset threshold by lowering the transfer rate of the data that is to be read in the memory module, when the temperature has reached a predetermined threshold.

However, in the technique of KOKAI Publication No. 2005-18329, since the control is executed to prevent the temperature of the memory module to reach the preset threshold by lowering the transfer rate of the data that is to be read in the memory module, the transfer rate of data decreases and the performance of the computer lowers.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 3 is an exemplary block diagram showing the structure including each of physical memory modules and a memory controller, which are included in the information processing apparatus of the first embodiment.

FIG. 7 is an exemplary block diagram showing the structure including each of physical memory modules and a memory controller, which are included in an information processing apparatus of a second embodiment.

DETAILED DESCRIPTION

Various embodiments will be described hereinafter with reference to the accompanying drawings.

In general, according to one embodiment, an information processing apparatus includes a plurality of memory modules, a measuring module, a determination module, and a controller. The measuring module is configured to initialize the memory modules by applying an equal load to each of the memory modules when the information processing apparatus has been booted and an operating system of the information processing apparatus has not yet been started, to measure a temperature of each of the memory modules at a time of the initialization, and to measure a maximum temperature of each of the memory modules when the operating system is running. The determination module is configured to determine a first memory module of the memory modules, which has the least difference between the temperature at the time of the initialization and the maximum temperature at the time when the operating system is running, and a second memory module of the memory modules, which has the lowest temperature at the time of the initialization. The controller is configured to map memory addresses, which are allocated to the first memory module, in the second memory module, based on the temperatures measured by the measuring module.

First Embodiment

Figure 1:
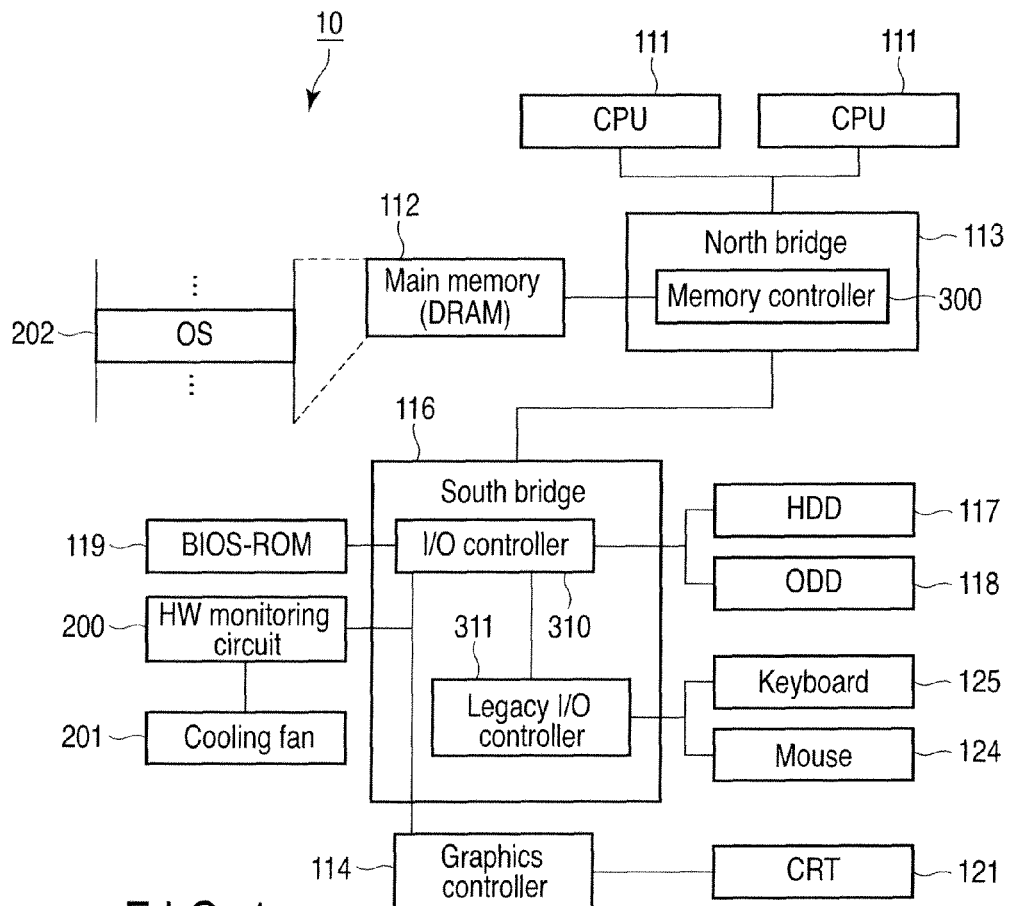
FIG. 1 is an exemplary block diagram showing the structure of an information processing apparatus according to a first embodiment.

To begin with, referring to FIG. 1, the structure of an information processing apparatus according to a first embodiment is described. The information processing apparatus of the embodiment is realized, for example, as a server-type computer 10. In this embodiment, the information processing apparatus is described as the computer 10, but it is not limited to the computer 10. For example, the information processing apparatus may be an apparatus including a plurality of physical modules, such as a notebook personal computer or a personal digital assistant (PDA).

As shown in FIG. 1, the computer 10 includes two CPUs 111, a north bridge 113, a main memory 112 (e.g. dynamic random access memory (DRAM)), a south bridge 116, a hard disk drive (HDD) 117, an optical disc drive (ODD) 118, a BIOS-ROM 119, a hardware (HW) monitoring circuit 200, a cooling fan 201, a mouse 124, a keyboard 125, a graphics controller 114, and a cathode ray tube (CRT) 121.

The CPUs 111 are processors for controlling the operation of the computer 10, and execute an operating system (OS) 202 and various application programs, which are loaded from the hard disk drive (HDD) 117 into the main memory 112.

The main memory 112 includes a plurality of memory modules (to be described later). These memory modules are provided with measuring modules (to be described later) for measuring the temperatures of the memory modules.

The north bridge 113 is a bridge device which connects a local bus of the CPUs 111 and the south bridge 116. The north bridge 113 includes a memory controller 300 which access-controls the main memory 112. The north bridge 113 has a function of executing communication with the graphics controller 114.

The graphics controller 114 is a display controller which controls the CRT (display) 121 which is used as a display monitor of the computer 10. A display signal, which is generated by the graphics controller 114, is sent to the CRT 121 of a display unit.

The south bridge 116 controls devices on a low pin count (LPC) bus. The south bridge 116 includes an integrated drive electronics (IDE) controller for controlling the hard disk drive (HDD) 117 and ODD 118. Further, the south bridge 116 has a function of executing communication with a sound controller. Besides, the south bridge 116 includes an IO controller 310 for controlling various IO devices, and a legacy IO controller 311 for controlling legacy IO devices such as a mouse.

The hardware (HW) monitoring circuit 200 is a circuit device which monitors the operation of the hardware such as the cooling fan 201.

The cooling fan 201 is a fan for cooling the various devices in the computer 10 by blowing the wind to the devices.

Figure 2:
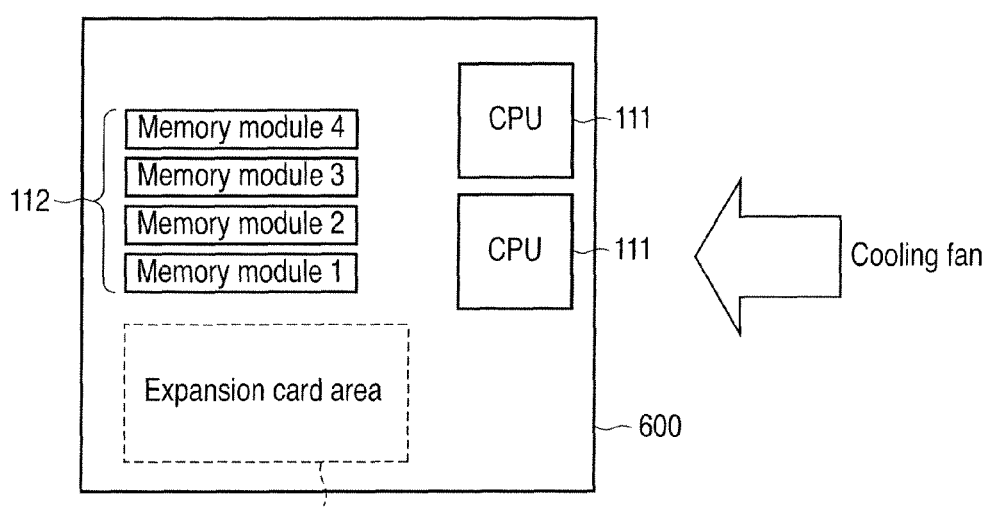
FIG. 2 illustrates an exemplary structure of a main board in the information processing apparatus of the first embodiment and the concept of a cooling state of each of devices on the main board.

FIG. 2 is a view illustrating the concept of a cooling state in which the various devices on a main board 600 in the computer 10 are cooled by the wind from the cooling fan 201.

On the main board 600 in the computer 10, there are disposed, for example, the two CPUs 111, the main memory (memory modules 1 to 4) 112, and an expansion card area 500. For example, if the wind of the cooling fan 201 flows from the side on which the two CPUs 111 of the main board 600 are disposed, the cooling conditions of the memory modules 1 to 4 (the temperatures of the memory modules 1 to 4) become different depending on the disposition of the two CPUs 111, etc. (e.g. the presence/absence of the expansion card).

If the temperatures of the memory modules 1 to 4 are different, as described above, optimal control is executed for the plural memory modules in the following manner. Specifically, control of switching memory mapping is executed based on the measured temperatures of the respective physical memory modules.

FIG. 3 is a view illustrating the concept of control of the physical memory modules (DIMM1 to DIMM4) by the memory controller 300.

The north bridge 113 includes the memory controller 300, a slot individual signal conversion circuit 510, and a memory mapping switch control circuit 511. The slot individual signal conversion circuit 510 and memory mapping switch control circuit 511 may be provided on the outside of the north bridge 113.

The slot individual signal conversion circuit 510 is disposed between the memory controller 300 and the physical memory modules (DIMM1 to DIMM4). The slot individual signal conversion circuit 510 switches individual signals (chip-select (CS#), ODT#, CKE) on a memory-slot-by-memory-slot basis. The memory mapping switch control circuit 511 reads the values of the operation temperatures of the respective physical memory modules (DIMM1 to DIMM4) and compares the cooling conditions of the respective memory slots (the description will be given later).

The memory modules (DIMM1 to DIMM4) are provided with temperature sensors 700, respectively. The temperature sensors 700 measure the temperatures of the respective memory modules (DIMM1 to DIMM4), and sends the values of the temperatures in response to a request from the memory mapping switch control circuit 511. The temperature sensors 700 are mounted on the respective physical memory modules (DIMM1 to DIMM4). As described above, the temperature sensors 700 are connected to the memory mapping switch control circuit 511 (a possible connection means may be an SMBus, or the like, but the connection means is not specifically limited). Besides, the temperature sensors 700 may not be mounted on the memory modules (DIMM1 to DIMM4), and thermistors, or the like, may be externally disposed.

The memory controller 300 sends to the slot individual signal conversion circuit 510 such information as data, addresses, bank-select, Row Address Strobe (RAS), Column Address Strobe (CAS), Write Enable (WE), chip-select, On Die Termination (ODT), and ClocK Enable (CKE).

The memory mapping switch control circuit 511 executes switching control of switching memory mapping based on the received temperatures of the memory modules (DIMM1 to DIMM4). In addition, the memory mapping switch control circuit 511 sends instruction signals to the slot individual signal conversion circuit 510, thereby to determine optimal mapping and execute optimization of memory mapping.

Figures 4, 5:
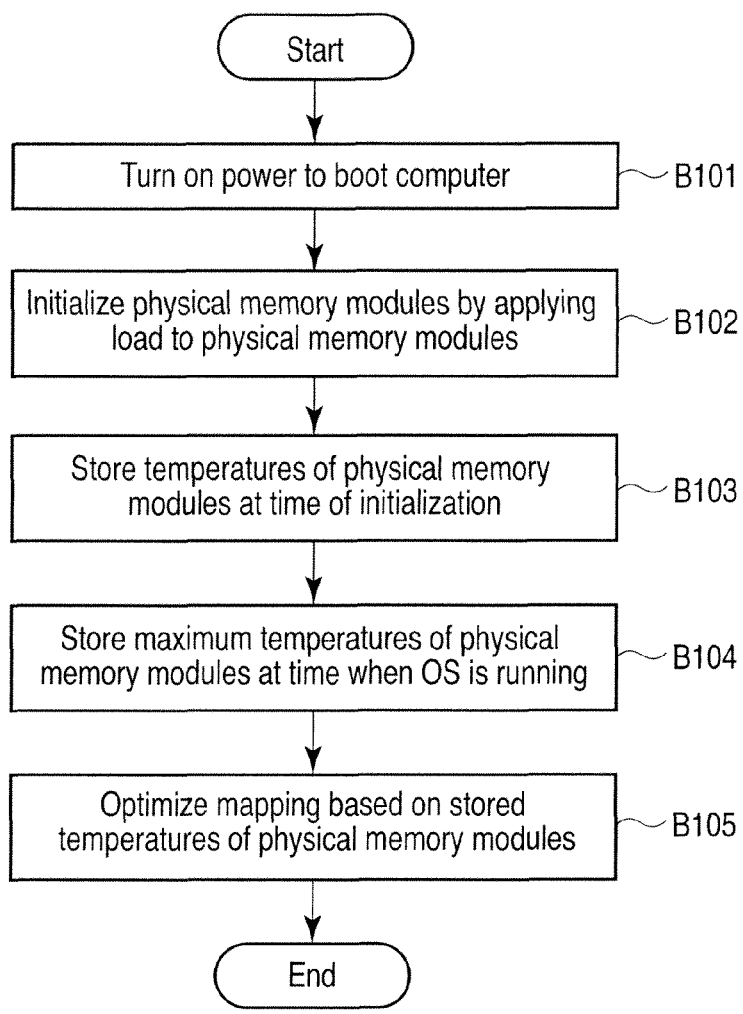
FIG. 4 is an exemplary flowchart illustrating the operation of a memory control method which is executed by the information processing apparatus of the first embodiment.
FIG. 5 shows exemplary measured temperatures of the respective physical modules used by the information processing apparatus of the first embodiment.

FIG. 4 is the flowchart illustrating the operation of a memory control method to which the information processing apparatus of the first embodiment is applied.

To start with, the computer 10 is booted by turning on the power (block B101). After the computer 10 is booted, the CPUs 111 initialize the memory (block B102). If the memory is initialized by the CPUs 111, a load is applied to the respective physical memory modules (DIMM1 to DIMM4) such that an equal load (e.g. a load of a memory check program) may be applied to these memory modules. In the initialization of the memory, a program, such as a memory check program, is executed on the respective physical memory modules (DIMM1 to DIMM4) in such a state that a maximum load is applied to the memory modules.

Then, the memory mapping switch control circuit 511 measures the temperatures of the physical memory modules (DIMM1 to DIMM4) by using the temperature sensors 700. The temperatures of the physical memory modules (DIMM1 to DIMM4) at this time indicate the temperatures at the time of the initialization of the physical memory modules (DIMM1 to DIMM4). The time of initialization corresponds to the state in which the computer 10 has been booted and the operating system 202 has not yet been started. The measured temperatures of the physical memory modules (DIMM1 to DIMM4) are stored in the HDD 117, for example, as shown in FIG. 5 (block B103). For instance, the temperature of the physical memory module DIMM1 is 70° C., the temperature of the physical memory module DIMM2 is 85° C., the temperature of the physical memory module DIMM3 is 80° C., and the temperature of the physical memory module DIMM4 is 75° C.

Subsequently, the computer 10 starts the operating system 202. While the operating system 202 runs, the memory mapping switch control circuit 511 constantly measures the temperatures of the respective physical memory modules (DIMM1 to DIMM4) by using the temperature sensors 700. If the maximum temperatures of the respective physical memory modules (DIMM1 to DIMM4) have been measured, the maximum temperatures are stored in the HDD 117, for example, as shown in FIG. 5 (block B104). For instance, the maximum temperatures of the respective physical memory modules (DIMM1 to DIMM4) at a certain time point are stored in the following manner. The maximum temperature of the physical memory module DIMM1 is 70° C., the maximum temperature of the physical memory module DIMM2 is 75° C., the maximum temperature of the physical memory module DIMM3 is 75° C., and the maximum temperature of the physical memory module DIMM4 is 60° C.

When the computer 10 is next booted, the memory mapping switch control circuit 511 executes control for optimizing the memory mapping switching (this optimization control may be executed when a request is issued from the CPUs 111) (block B105).

Figure 6:
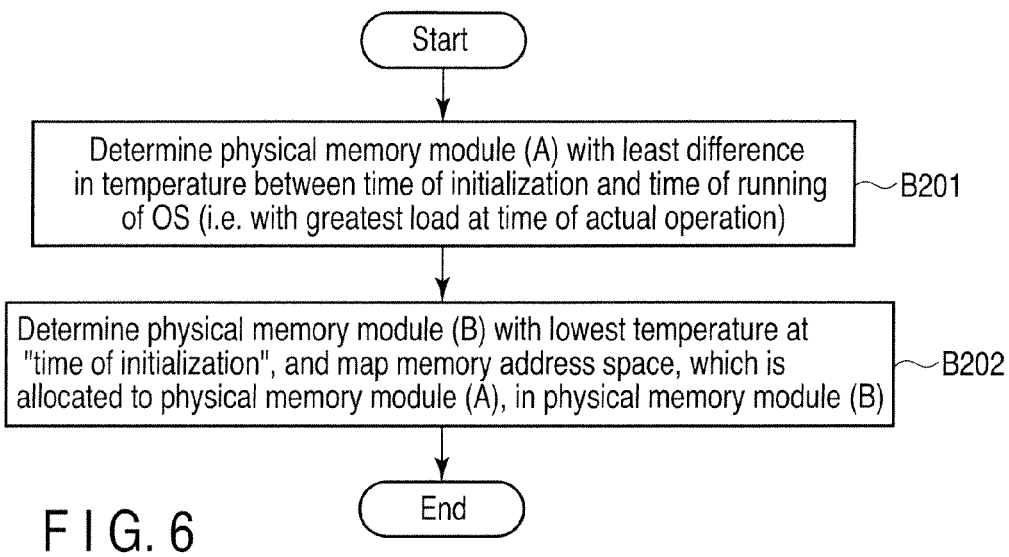
FIG. 6 is an exemplary flowchart illustrating the operation of the memory control method which is executed by the information processing apparatus of the first embodiment.

FIG. 6 is the flowchart illustrating the control for optimizing the memory mapping switching executed by the memory mapping switch control circuit 511.

The memory mapping switch control circuit 511 compares the temperatures of the physical memory modules (DIMM1 to DIMM4) at the time of initialization with the maximum temperatures of the physical memory modules (DIMM1 to DIMM4). The differences between these temperatures are, for example, as shown in FIG. 5. For instance, the difference in temperature of the physical memory module DIMM1 is 0° C., the difference in temperature of the physical memory module DIMM2 is −10° C., the difference in temperature of the physical memory module DIMM3 is −5° C., and the difference in temperature of the physical memory module DIMM4 is −15° C. The memory mapping switch control circuit 511 determines a physical memory module (A) with the least difference between the temperature at the time of initialization and the temperature at the time of running of the OS (i.e. a physical memory module with a greatest load at the time of actual operation) (block B201). As shown in FIG. 5, the physical memory module (A) is determined to be the physical memory module DIMM1 with the least difference in temperature. Then, the memory mapping switch control circuit 511 determines a physical memory module (B) with the lowest temperature at the time of initialization. The physical memory module (B) is determined to be the physical memory module DIMM1 with the lowest temperature at the time of initialization. The memory mapping switch control circuit 511 maps the memory addresses, which is allocated to the physical memory module (A), in the physical memory module (B) (block B202). In this case, since both the physical memory module (A) and the physical memory module (B) are the physical memory module DIMM1, the memory mapping switch control circuit 511 determines that the memory modules are in the optimal state and no process is executed.

If the memory mapping switch control circuit 511 has determined that the physical memory module (A) and the physical memory module (B) are different physical memory modules, the memory mapping switch control circuit 511 maps the memory addresses, which are allocated to the physical memory module (A), in the physical memory module (B). That is, the memory addresses, which are allocated to the physical memory module (A) with the greatest load at the time of actual operation (at the time of running the OS), is mapped in the physical memory module (B) with the lowest temperature at the time of initialization. In this case, the memory mapping switch control circuit 511 executes switch control of memory mapping. Specifically, the memory mapping switch control circuit 511 maps the memory addresses, which are allocated to the physical memory module (A), in the physical memory module (B), and maps the memory addresses, which are allocated to the physical memory module (B), in the physical memory module (A).

In addition, in order to perform optimization of the memory mapping, the memory mapping switch control circuit 511 sends an instruction signal to the slot individual signal conversion circuit 510. In response to receiving the instruction signal, the slot individual signal conversion circuit 510 maps the memory addresses allocated to the respective physical memory modules (DIMM1 to DIMM4), based on the instruction signal which instructs a mapping process that is determined by the memory mapping switch control circuit 511.

The mapping from logical memory addresses to a physical memory addresses is, in general, implemented by the function of an operating system, as a method for realizing a virtual memory. In addition, how to map physical memory addresses in the respective physical memory modules (DIMM1 to DIMM4) is implemented as a function of the memory controller 300. The memory controller 300 determines a mapping method of physical memory addresses, which are optimal in terms of capabilities, based on the specifications of the physical memory modules (DIMM1 to DIMM4) mounted in the computer 10, the setting by the BIOS-ROM 119, etc. Thereby, when the computer 10 is booted, mapping is executed from the logical memory addresses to the physical memory addresses.

The description has been given above of the flowchart, which illustrates the operation of the memory control method to which the information processing apparatus of the first embodiment is applied.

As has been described above, using the present embodiment, the memory addresses, which are allocated to the physical memory module (A) with the greatest load at the time of actual operation (at the time of running the OS), can be mapped in the physical memory module (B) with the lowest temperature at the time of initialization. Therefore, the temperature rise of each physical memory module can be reduced to a minimum, and the optimal memory module control can be executed. Even if the cooling conditions of the respective physical memory modules are different due to the layout of the physical memory modules on the main board of the computer 10, the optimal memory module control can be executed.

Second Embodiment

The structure of an information processing apparatus according to a second embodiment is described with reference to FIG. 7. In this embodiment, a description is given of an example in which each of the physical memory modules (DIMM1 to DIMM4) is allocated to either of two channels. In addition, the north bridge 113 further includes a channel common signal conversion circuit 512.

The north bridge 113 includes the memory controller 300, slot individual signal conversion circuit 510, memory mapping switch control circuit 511, and channel common signal conversion circuit 512. The slot individual signal conversion circuit 510, memory mapping switch control circuit 511 and channel common signal conversion circuit 512 may be provided outside the north bridge 113.

The channel common signal conversion circuit 512 is a conversion circuit which is disposed between the memory controller 300 and the physical memory modules (DIMM1 to DIMM4). The channel common signal conversion circuit 512 switches signals (data, addresses, bank select signal, control signals such as RAS/CAS/WE), which are common to each channel, on a channel-by-channel basis.

The memory controller 300 includes a channel A (chA) module and a channel B (chB) module, which execute channel control. For example, the respective physical memory modules (DIMM1 to DIMM4) are configured to be allocated to two channels. The physical memory modules DIMM1 and DIMM2 are allocated to the channel A (chA), and the physical memory modules DIMM3 and DIMM4 are allocated to the channel B (chB).

Next, a description is given of the operation of a memory control method to which the information processing apparatus according to the second embodiment is applied. This memory control method is common to that of the first embodiment with respect to block B101 to block B105 in the flowchart of FIG. 4.

Figure 8:
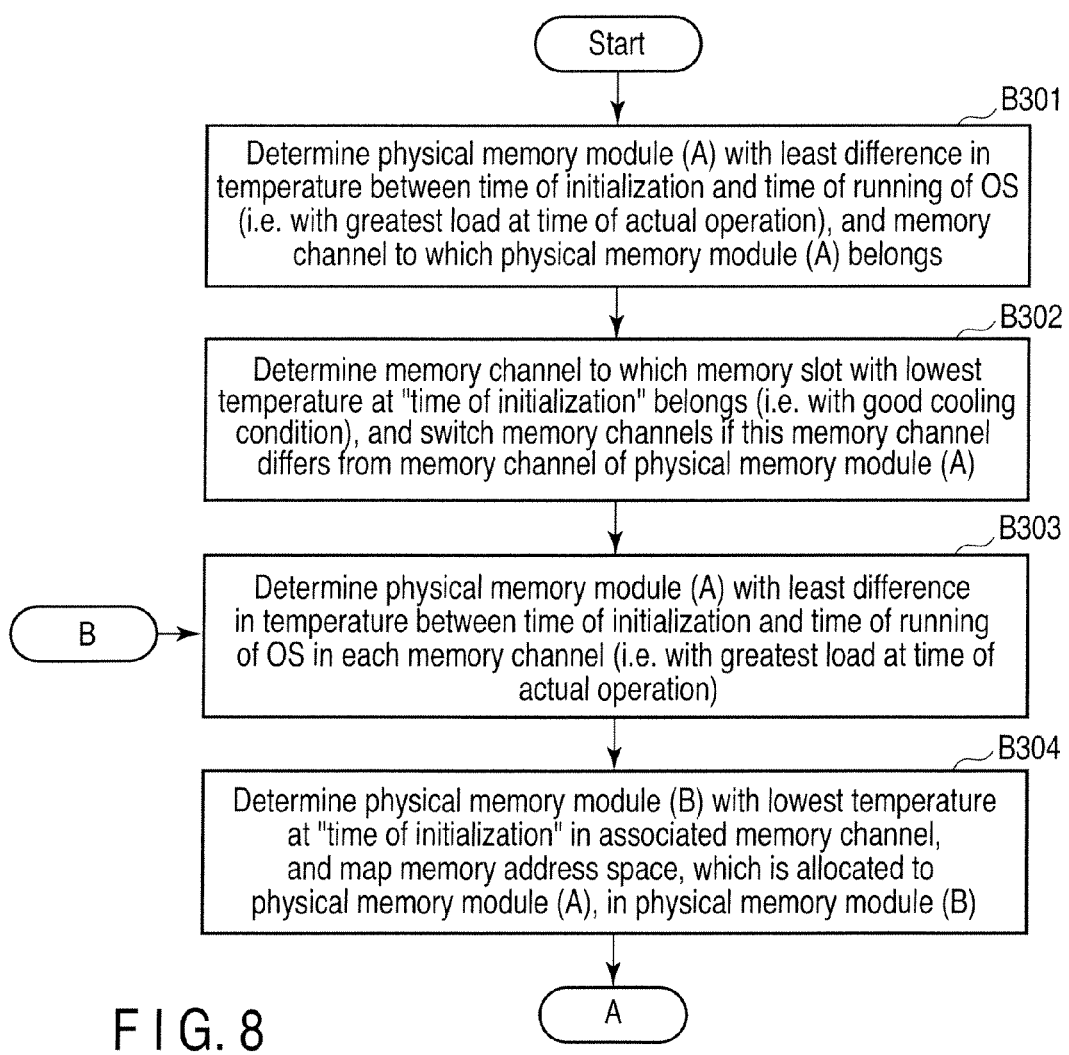
FIG. 8 is an exemplary flowchart illustrating the operation of a memory control method executed by the information processing apparatus of the second embodiment.
Figures 9, 10:
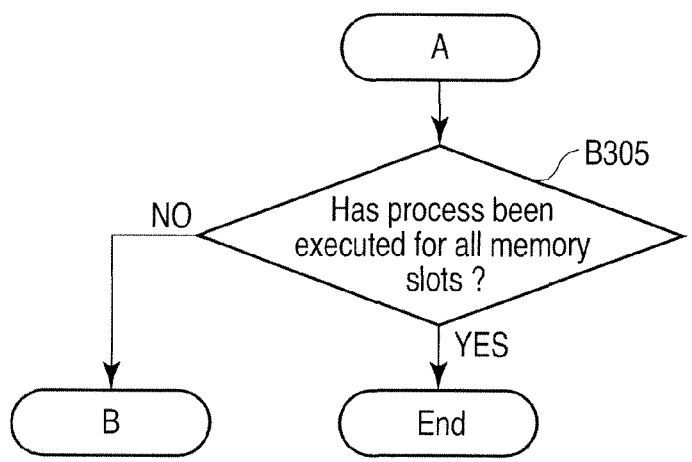
FIG. 9 is an exemplary flowchart illustrating the operation of the memory control method executed by the information processing apparatus of the second embodiment.
FIG. 10 shows exemplary measured temperatures of the respective physical modules used by the information processing apparatus of the second embodiment.

FIG. 8 and FIG. 9 are the flowchart illustrating the control for optimizing the memory mapping switching according to the second embodiment.

The memory mapping switch control circuit 511 compares the temperatures of the physical memory modules (DIMM1 to DIMM4) at the time of initialization with the maximum temperatures of the physical memory modules (DIMM1 to DIMM4) (see FIG. 10). The memory mapping switch control circuit 511 determines a physical memory module (A) with the least difference between the temperature at the time of initialization and the temperature at the time of running of the OS (i.e. a physical memory module with a greatest load at the time of actual operation). At the same time, the memory mapping switch control circuit 511 determines a memory channel to which the physical memory module (A) belongs (block B301). For example, in FIG. 10, the memory mapping switch control circuit 511 determines that the physical memory module (A) with the least difference between the temperature at the time of initialization and the temperature at the time of running of the OS is the physical memory module DIMM1. In addition, the memory mapping switch control circuit 511 determines that the memory channel to which the physical memory module DIMM1 belongs is "channel A (chA)".

Subsequently, the memory mapping switch control circuit 511 determines a physical memory module (B) which correspond to a memory slot with the lowest temperature at the "time of initialization" (i.e. a slot with a good cooling condition means a memory module with a good cooling condition). For example, in FIG. 10, the memory mapping switch control circuit 511 determines that the physical memory module (B), which is a memory module with the lowest temperature at the "time of initialization", is the physical memory module DIMM1. If the physical memory module (B) is different from the physical memory module (A), a change (switching) of the memory channels is executed (block B302). Specifically, the memory channel, to which the physical memory module with the greatest load at the time of actual operation belongs, is changed for the memory channel, to which the memory module with the good cooling condition belongs, thereby being improved the cooling for the memory channel, to which the physical memory module with the greatest load at the time of actual operation belongs. In the above-described case (in FIG. 10), since both the physical memory module (A) and the physical memory module (B) are the physical memory module DIMM1, the memory mapping switch control circuit 511 determines that the mapping of the memory modules is in the optimal state. Thus, no change of the memory channel is executed. The change of the memory channel is executed by the channel common signal conversion circuit 512 by the instruction signal which is sent from the memory mapping switch control circuit 511 to the channel common signal conversion circuit 512.

Subsequently, the following determination is executed in each memory channel. For example, in the channel A (chA), as shown in FIG. 10, the memory mapping switch control circuit 511 determines that the physical memory module (A) is the physical memory module DIMM1 with the least difference in temperature (block B303). Then, the memory mapping switch control circuit 511 determines the physical memory module (B) with the lowest temperature at the time of initialization. The physical memory module (B) is determined to be the physical memory module DIMM1 with the lowest temperature at the time of initialization. The memory mapping switch control circuit 511 maps the memory addresses, which are allocated to the physical memory module (A), to the physical memory module (B) (block B304). In this case, since both the physical memory module (A) and the physical memory module (B) are the physical memory module DIMM1, the memory mapping switch control circuit 511 determines that the mapping of the modules in channel A is in the optimal state and no process is executed.

In addition, for example, in the channel chB, the memory mapping switch control circuit 511 determines that the physical memory module (A) is the physical memory module DIMM3 with the least difference in temperature (block B303). Subsequently, the memory mapping switch control circuit 511 determines the physical memory module (B) with the lowest temperature at the time of initialization. The physical memory module (B) is determined to be the physical memory module DIMM4 with the lowest temperature at the time of initialization. The memory mapping switch control circuit 511 maps the memory addresses, which are allocated to the physical memory module (A), in the physical memory module (B) (block B304). In this case, the memory addresses, which are allocated to the physical memory module DIMM3, is mapped in the physical memory module DIMM4. Thus, by changing the memory module, to which the physical memory module with the greatest load at the time of actual operation belongs, to the memory module with the good cooling condition, the cooling of the physical memory module with the greatest load at the time of actual operation can be improved. In this case, the memory mapping switch control circuit 511 sends an instruction signal to the slot individual signal conversion circuit 510 in order to optimize the memory mapping. In response to receiving the instruction signal, the slot individual signal conversion circuit 510 maps the memory addresses that are allocated to the physical memory modules (DIMM1 to DIMM4), based on the instruction signal which instructs the mapping process that is determined by the memory mapping switch control circuit 511.

Subsequently, the memory mapping switch control circuit 511 determines whether the process has been executed for all the memory slots (block B305). If it is determined in block B305 that the process has been executed for all the memory slots (YES in block B305), the process is finished. In other words, the memory mapping switch control circuit 511, which is the determination module, continues the process until the determination has been executed for all the physical memory modules (DIMM1 to DIMM4). On the other hand, if it is determined in block B305 that the process has not been executed for all the memory slots (NO in block B305), the process goes to block B303.

The description has been given above of the flowchart, which illustrates the operation of the memory control method to which the information processing apparatus of the second embodiment is applied.

As has been described above, using the present embodiment, even if a plurality of memory modules are constructed by using a plurality of channels, the temperature rise of each physical memory module can be reduced to a minimum, and the optimal memory module control can be executed.

In the above-described embodiments, the control for optimizing the memory mapping switching is executed by using hardware, such as the memory mapping switch control circuit 511, but it may be executed by using an application program such as a memory control application.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
   a plurality of memory modules;
   a measuring module configured to (i) initialize the plurality of memory modules by applying equal loads to the plurality of memory modules when the information processing apparatus has been booted and an operating system of the information processing apparatus has not yet been started, (ii) measure temperatures of the plurality of memory modules at a time of the initialization, and (iii) measure maximum temperatures of the plurality of memory modules when the operating system is running;
   a determination module configured to determine a first determination of a first memory module of the plurality of memory modules, which has the least difference between the temperature at the time of the initialization and the maximum temperature when the operating system is running, and a second determination of a second memory module of the plurality of memory modules, which has the lowest temperature at the time of the initialization, based on the temperatures measured by the measuring module; and
   a control module configured to map memory addresses, which are allocated to the first memory module, in the second memory module, wherein the first memory module has the first determination and the second memory module has the second determination.

2. The information processing apparatus of claim 1, wherein each of the plurality of memory modules is configured to belong to one of a plurality of channels, and
   the determination module is configured to determine a first channel to which the first memory module belongs and a second channel to which the second memory module belongs, and
   the control module is configured to interchange the first channel and the second channel, if the first channel and the second channel are determined to be different channels.

3. The information processing apparatus of claim 2, wherein the determination module is configured to determine the first memory module and the second memory module in each of the plurality of channels, and
   the control module is configured to map memory addresses, which are allocated to the first memory module, in the second memory module.

4. The information processing apparatus of claim 2, further comprising a channel common converter configured to send signals for the plurality of channels to the memory modules belonging to the plurality of channels,
   wherein the control module is configured to send an instruction signal to the channel common converter, and
   the channel common converter is configured to interchange the plurality of channels in response to receiving the instruction signal.

5. The information processing apparatus of claim 1, further comprising a memory module individual converter configured to execute conversion of signals which are sent to the plurality of memory modules,
   wherein the control module is configured to send an instruction signal to the memory module individual converter, and
   the memory module individual converter is configured to map the memory addresses in response to receiving the instruction signal.

6. A memory control method of use in an information processing apparatus, the information processing apparatus comprises a plurality of memory modules and a measuring module configured to initialize the plurality of memory modules by applying equal loads to the plurality of memory modules when the information processing apparatus has been booted and an operating system of the information processing apparatus has not yet been started, to measure temperatures of the plurality of memory modules at a time of the initialization, and to measure maximum temperatures of the plurality of memory modules when the operating system is running, the method comprising:
   performing a first determination of a first memory module of the plurality of memory modules, which has the least difference between the temperature at the time of the initialization and the maximum temperature when the operating system is running;
   performing a second determination of a second memory module of the plurality of memory modules, which has the lowest temperature at the time of the initialization, based on the temperatures measured by the measuring module; and
   mapping memory addresses, which are allocated to the first memory module, in the second memory module, wherein the first memory module has the first determination and the second memory module has the second determination.

7. The memory control method of claim 6, wherein each of the plurality of memory modules is configured to belong to one of a plurality of channels,
   the determining of the first memory module and the second memory module is configured to determine a first channel to which the first memory module belongs and a second channel to which the second memory module belongs, and
   the mapping is configured to interchange the first channel and the second channel, if the first channel and the second channel are determined to be different channels.

8. The memory control method of claim 7, wherein the determining of the first memory module and the second memory module is configured to determine the first memory module and the second memory module in each of the plurality of channels, and
   the mapping is configured to map memory addresses, which are allocated to the first memory module, in the second memory module.

9. The memory control method of claim 7, wherein the information processing apparatus further comprises a channel common converter configured to send signals for the plurality of channels to the memory modules belonging to the plurality of channels, wherein the mapping is configured to send to the channel common converter an instruction signal which make the channel common converter switch the plurality of channels in response to receiving the instruction signal.

10. The memory control method of claim 6, wherein the information processing apparatus further comprises a memory module individual converter configured to execute conversion of signals which are sent to the plurality of memory modules, wherein the mapping is configured to send to the memory module individual converter an instruction signal which make the memory module individual converter map the memory addresses in response to receiving the instruction signal.

* * * * *